United States Patent
Linde et al.

(10) Patent No.: US 11,419,266 B2
(45) Date of Patent: Aug. 23, 2022

(54) VARIABLE FAN DRIVE DEPENDENT ON CLEANING FAN DRIVE LOAD

(71) Applicant: CNH Industrial America LLC, New Holland, PA (US)

(72) Inventors: Karl Robert Linde, Leola, PA (US); Todd Allen Cannegieter, Boiling Springs, PA (US)

(73) Assignee: CNH Industrial America LLC, New Holland, PA (US)

( * ) Notice: Subject to any disclaimer, the term of this patent is extended or adjusted under 35 U.S.C. 154(b) by 568 days.

(21) Appl. No.: 16/512,544

(22) Filed: Jul. 16, 2019

(65) Prior Publication Data
US 2020/0015417 A1 Jan. 16, 2020

Related U.S. Application Data

(60) Provisional application No. 62/698,389, filed on Jul. 16, 2018.

(51) Int. Cl.
*A01D 41/127* (2006.01)
*A01F 12/44* (2006.01)
*A01D 69/02* (2006.01)

(52) U.S. Cl.
CPC ........ *A01D 41/1276* (2013.01); *A01F 12/444* (2013.01); *A01D 69/02* (2013.01); *A01F 12/446* (2013.01)

(58) Field of Classification Search
CPC .. A01D 41/1276; A01D 69/02; A01D 41/127; A01F 12/444; A01F 12/446; A01F 12/58
See application file for complete search history.

(56) References Cited

U.S. PATENT DOCUMENTS

| | | | |
|---|---|---|---|
| 6,442,916 B1 * | 9/2002 | Pope | A01D 41/1271 56/10.2 R |
| 7,645,190 B2 | 1/2010 | Schwinn et al. | |
| 7,846,013 B1 | 12/2010 | Diekhans | |
| 9,706,709 B2 | 7/2017 | Cracraft et al. | |

(Continued)

FOREIGN PATENT DOCUMENTS

| | | | | |
|---|---|---|---|---|
| EP | 693252 A1 * | 1/1996 | ......... | A01D 41/1276 |
| EP | 1862056 A1 * | 12/2007 | ......... | A01D 41/1276 |

(Continued)

OTHER PUBLICATIONS

Extended European Search Report for EP Application No. 19186366.1 dated Jan. 8, 2020 (six pages).

*Primary Examiner* — Arpad Fabian-Kovacs
(74) *Attorney, Agent, or Firm* — Peter Zacharias; Patrick Sheldrake

(57) ABSTRACT

Included is a combine having a feeder housing for receiving harvested crop, a separating system for threshing the harvested crop to separate grain from residue, a crop cleaning system including a cleaning fan powered by a fan drive to propel the residue into a residue system of the combine, at least one sensor for detecting an operational parameter of the fan drive, and a controller coupled to the at least one sensor. The controller is configured to determine a load on the fan drive from the detected operational parameter, compare the determined load to a load threshold, and control a speed of the cleaning fan based on the comparison.

20 Claims, 9 Drawing Sheets

(56) References Cited

U.S. PATENT DOCUMENTS

| | | | | |
|---|---|---|---|---|
| 10,091,934 B2* | 10/2018 | Dugas | ............... | A01D 41/1276 |
| 10,645,876 B2* | 5/2020 | Dugas | ................... | A01D 45/10 |
| 2009/0299564 A1* | 12/2009 | Sheidler | ................ | A01D 69/02 |
| | | | | 701/31.4 |
| 2016/0081271 A1 | 3/2016 | Mott et al. | | |
| 2017/0094901 A1* | 4/2017 | French, Jr | ............ | A01D 41/127 |
| 2017/0251601 A1 | 9/2017 | Dugas et al. | | |
| 2019/0059232 A1* | 2/2019 | Ricketts | ................ | A01F 12/444 |
| 2019/0274253 A1* | 9/2019 | Wold | .................... | A01F 12/444 |
| 2020/0337233 A1* | 10/2020 | Groves | ................. | A01D 34/30 |

FOREIGN PATENT DOCUMENTS

| | | | | |
|---|---|---|---|---|
| EP | 2022312 A2 | 2/2009 | | |
| EP | 2127515 A1 | 12/2009 | | |
| WO | WO-2020126211 A1 * | 6/2020 | ............. | A01F 12/44 |
| WO | WO-2020126308 A1 * | 6/2020 | ......... | A01D 41/1272 |
| WO | WO-2021144701 A * | 7/2021 | ......... | A01D 41/1276 |

* cited by examiner

402

| PRESSURE THRESHOLD | FAN SPEED |
|---|---|
| H1 | SPEED1 |
| H2 | SPEED2 |
| H3 | SPEED3 |
| H4 | SPEED4 |

404

| TORQUE THRESHOLD | FAN SPEED |
|---|---|
| T1 | SPEED1 |
| T2 | SPEED2 |
| T3 | SPEED3 |
| T4 | SPEED4 |

406

| ELECTRIC THRESHOLD | FAN SPEED |
|---|---|
| E1 | SPEED1 |
| E2 | SPEED2 |
| E3 | SPEED3 |
| E4 | SPEED4 |

FIG. 4A

VARIABLE FAN DRIVE DEPENDENT ON CLEANING FAN DRIVE LOAD

FIELD

The disclosure relates to a combine that automatically controls a speed of a fan in a cleaning system based on fan drive load.

BACKGROUND

Combines are used to harvest crops. Operations performed by these combines include threshing and separating grain from materials other than grain (MOG). The separating system includes perforated pans configured such that grain falls through the perforated pans into a cleaning system to be collected, and MOG is blocked from entering the cleaning system. A fan is employed in the cleaning system (below the perforated pan) in order to remove this MOG. The goal is to blow the MOG out of the cleaning system and into a residue handling system. In conventional combines, the efficiency of the cleaning system is affected by the combine's throughput which varies during harvesting.

SUMMARY

An embodiment includes a combine comprising a feeder housing for receiving harvested crop, a separating system for threshing the harvested crop to separate grain from residue, a crop cleaning system including a cleaning fan powered by a fan drive to propel the residue into a residue system of the combine, at least one sensor for detecting an operational parameter of the fan drive, and a controller coupled to the at least one sensor. The controller is configured to determine a load on the fan drive from the detected operational parameter, compare the determined load to a load threshold, and control a speed of the cleaning fan based on the comparison.

Another embodiment includes a method for controlling a combine comprising receiving, by a feeder housing, harvested crop, threshing, by a separating system, the harvested crop to separate grain from residue, cleaning, by a crop cleaning system including a cleaning fan powered by a fan drive, by propelling the residue into a residue system of the combine, detecting, by at least one sensor, an operational parameter of the fan drive, determining, by a controller coupled to the at least one sensor, a load on the fan drive from the detected operational parameter, comparing, by the controller, the determined load to a load threshold, and controlling, by the controller, a speed of the cleaning fan based on the comparison.

BRIEF DESCRIPTION OF THE FIGURES

FIG. 4A shows three tables with fan speed levels corresponding to pressure, torque and electric thresholds, according to an embodiment of the disclosure.

DETAILED DESCRIPTION

Aspects of the disclosure provide methods and systems for operating a combine to automatically control the speed of a cleaning fan based on the load required to drive the fan. The system determines load on the cleaning fan and automatically controls the fan speed to increase efficiency of the cleaning system.

The terms "grain" and "residue" are used principally throughout the specification for convenience but it is to be understood that these terms are not intended to be limiting. Thus "grain" refers to that part of the crop material which is threshed and separated from the discardable part of the crop material, which is referred to as non-grain crop material, material other than grain (MOG) that is generally discharged from the combine as "residue."

Figure 1A:
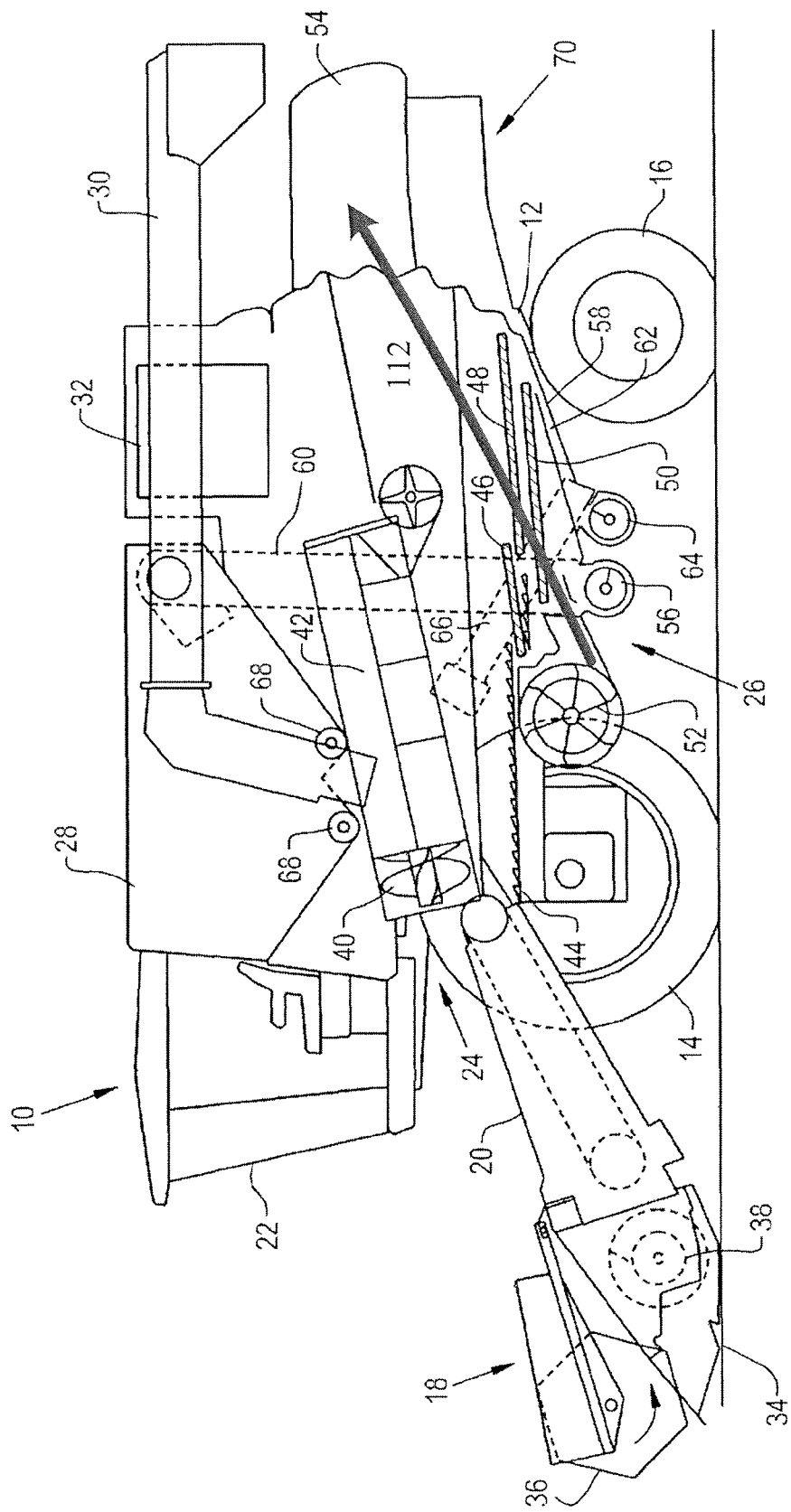
FIG. 1A is a side view of a combine, according to an embodiment of the disclosure.

Referring now to the drawings, and more particularly to FIG. 1A, there is shown an embodiment of an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half-tracks.

Header 18 is mounted to the front of combine 10 and includes a cutter bar 34 for severing crops from a field during forward motion of combine 10. Header 18 may be removable from the combine such that headers designed for particular crops are interchangeable. In one example, a rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger MOG elements, such as stalks, leaves and the like are discharged from the rear of combine 10. Smaller elements of crop material including grain and small MOG, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow 112 through the sieves to remove chaff and other impurities such as dust from the grain by making this material airborne along path 112 for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Some MOG from cleaning system 26 fall to a tailings auger trough 62. The MOG is transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

The MOG proceeds through a residue handling system 70. Residue handling system 70 includes a chopper, counter knives, a swath selection door and a residue spreader. When combine 10 is operating in the chopping and spreading mode, the chopper is set to a relatively high speed (e.g., 3,000 RPM), the counter knives may be engaged, the swath selection door is closed and the residue spreader is running (e.g., rotating). This causes the MOG to be chopped in to pieces of approximately 6 inches or less and spread on the ground in a fairly uniform manner. In contrast, when combine 10 is operating in the windrow mode, the chopper is set to a relatively low speed (e.g., 800 RPM), the counter knives are disengaged and the swath selection door is open. The residue spreader may continue operation to spread only chaff, with the other crop material passing through the passageway created by the open swath selection door.

Figure 1B:
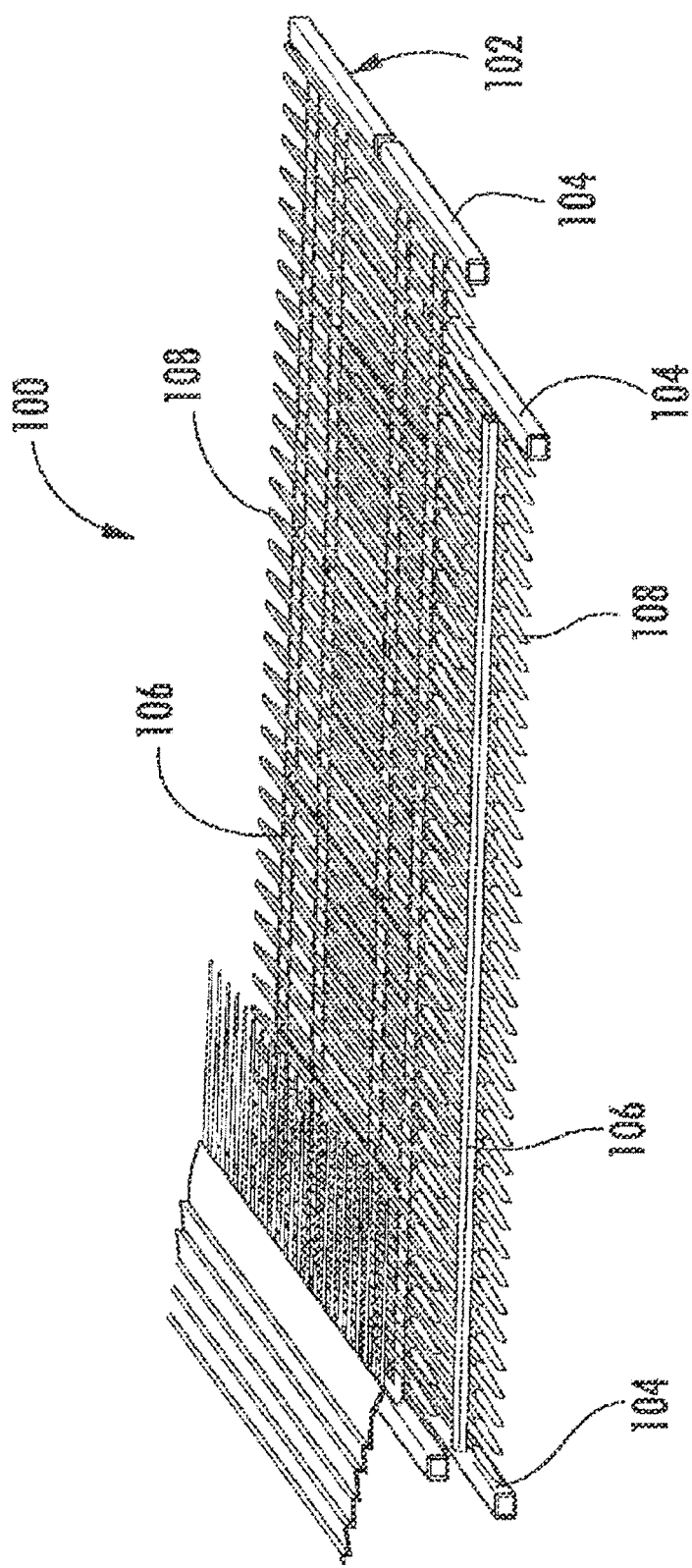
FIG. 1B is a perspective view of a sieve assembly for use in the combine cleaning system, according to an embodiment of the disclosure.

FIG. 1B shows an example of a sieve assembly 100 which may be used for one or more of the pre-cleaning sieve 46, upper sieve 48 and lower sieve 50 of cleaning system 26. Sieve assembly 100 generally includes a frame structure 102 typically comprised of longitudinal members 106 and transverse members 104 that define a grid-type configuration. Sieve elements 108 are supported by the frame structure 102. The disclosure is not limited by any particular type of sieve element 108 or frame structure 102. Typical sieve elements 102 may be louver elements, as is generally well-known in the art and need not be described in detail herein.

Regardless of the operational mode, the combine's ability to efficiently harvest the crop is affected by many factors including grain yield, grain loss and crop throughput. Loss is generally defined as a percentage of grain lost to total grain harvested. Loss includes grain that is accidentally blown by cleaning fan 52 into the straw hood 54 and ejected from the combine with the residue rather than being collected in the tank. In contrast, yield is generally defined as the amount of grain collected in the tank (e.g., bushels). Throughput is the amount of crop being processed by the combine at a given time. Generally, throughput can be computed by measuring yield over a time period.

Throughput is a factor that has a significant effect on the efficiency of the cleaning system. For example, in a low throughput state (when a low volume of MOG falls onto the sieves), the airflow from cleaning fan may be too strong, and inadvertently blow grain out of the cleaning system along with the residue. As a result, this grain is ejected from the combine and lost. In contrast, in high throughput state (when a high volume of MOG falls onto the sieves), the airflow from cleaning fan may be too weak to properly blow the MOG into the residue system. As a result, MOG makes its way into grain tank 28.

In order to avoid these problems, the present system allows the combine to control the fan speed automatically based on fan drive load. The operator or some other entity sets multiple fan drive load thresholds and corresponding fan speeds prior to harvesting. These thresholds and corresponding fan speeds may be set based on a number of factors including but not limited to fan drive specifications, harvester ground speed, thresher speed, type of crop, land features, etc. During harvesting, the controller monitors the fan drive load and compares the detected values to the thresholds. The controller then adjusts the fan speed to a level that corresponds to the respective threshold. There may be several points during harvesting at which the controller adjusts the fan speed. This method results in lower grain loss while maintaining a high quality sample. The operator and/or a third party (e.g., farm manager) can set these thresholds and corresponding fan speeds based upon one or more conditions. The operator may also adjust these thresholds and corresponding fan speeds during harvesting.

The volume of MOG that falls onto the perforated pans creates aeronautical backpressure within the cleaning system that affects a load of the fan drive. The load of the fan drive is the amount of power (e.g., hydraulic, electric, torque, etc.) the fan drive requires in order to drive the cleaning fan at the set speed. For example, when throughput is low, a small volume of MOG falls on the perforated pans. In this situation, there is little aeronautical backpressure resulting in a strong aeronautical flow. In contrast, when throughput is high, a large volume of MOG falls on the perforated pans. In this situation, there is significant aeronautical backpressure resulting in a weak aeronautical flow. Although it may seem counterintuitive, the load on the fan drive (e.g., the power required by the fan drive to drive the fan at the set speed) actually increases with a decrease in aeronautical backpressure (e.g., in low MOG volume situations) and decreases with an increase in aeronautical backpressure (e.g., in high MOG volume situations).

This relationship between aeronautical backpressure and fan drive load allows the combine to determine the volume of MOG being processed by the cleaning system (e.g., the load on the cleaning system). Based on this determination, the combine can then increase or decrease the speed of the fan to better process the MOG (e.g., increase fan speed when fan drive load is low, and decrease fan speed when fan drive load is high).

Figure 2A:
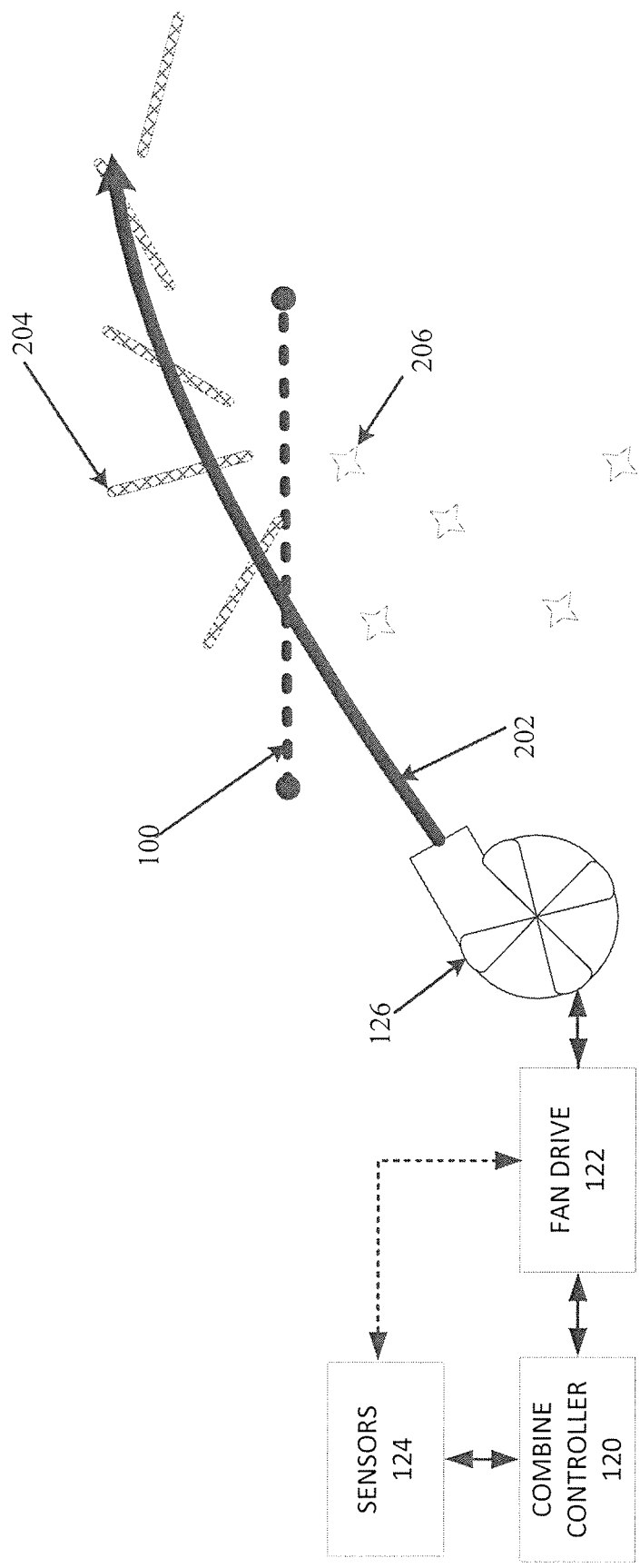
FIG. 2A is a block diagram of a fan for use in the combine cleaning system, according to an embodiment of the disclosure.

FIG. 2A shows a block diagram of a system for use in the combine cleaning system. The cleaning fan system includes fan 126 (e.g., centrifugal fan) positioned below cleaning sieve 100. The cleaning system also includes fan drive 122 (e.g., electric motor, hydraulic motor, transmission, etc.) for mechanically driving fan 126 based on instructions from combine controller 120. Also included are optional sensors 124 that are monitored by combine controller 120. In one example, controller 120 uses sensors 124 to monitor the load (e.g., power requirements) of fan drive 122.

During operation, MOG 204 falls from separating system 42 onto cleaning sieve 100. Combine controller 120 controls fan 126 to blow air along flow path 202 through sieve 100 to propel MOG 204 away from the cleaning system and into the combine residue system, while allowing grain 206 to fall through sieve 100 into the grain collection system (not shown). In a 100% efficient system, fan 126 blows all of the MOG into the residue system, and all of the grain falls through sieve 100. In practice, however, the cleaning system is not 100% efficient, because some of the MOG falls through sieve 100, and fan 126 blows some of the grain into the residue system.

A goal of combine controller 120 is to control the speed of fan 126 to increase, and possibly optimize the efficiency of the cleaning system. This goal is accomplished, in this example, by using sensors 124 to monitor the load on fan drive 122 and adjust the fan speed accordingly.

For example, when controller 120 determines that the load of the fan drive is less than a load threshold (e.g., a high volume of MOG is present), controller 120 increases power output by the fan drive to increase the fan speed resulting in an increase in the power of airflow 202. This ensures that the airflow is strong enough to propel the high volume of MOG into the residue system. In contrast, when controller 120 determines that the load of the fan drive is greater than a load threshold (e.g., a low volume of MOG is present), controller 120 decreases power output by the fan drive to decrease the fan speed resulting in a decrease in the power of airflow 202. This ensures that the airflow is not too strong to accidentally propel grain into the residue system. During operation, controller 120 continuously or periodically monitors sensor 124 and adjusts the speed of cleaning fan 126 to compensate for the volume of MOG being processed by the cleaning system.

Figure 2B:
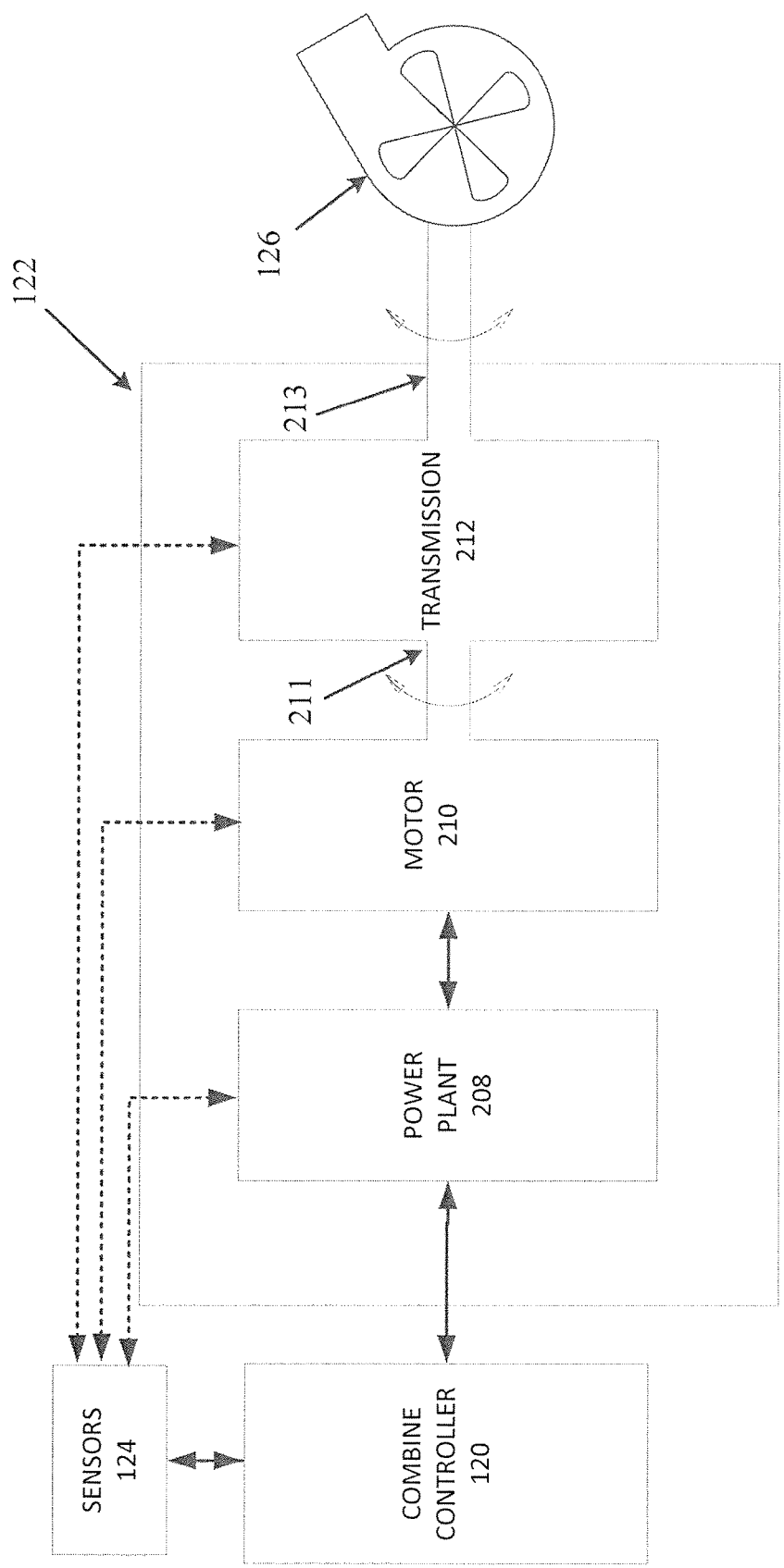
FIG. 2B is a block diagram of a drive system of the fan, according to an embodiment of the disclosure.

FIG. 2B is another block diagram of the drive system of the fan with more details for clarity. Similar to FIG. 2A, the block diagram includes combine controller 120, sensors 124 for detecting operational parameters (e.g. hydraulic pressure, electrical power, torque, etc. of fan drive 122 and/or fan 126), cleaning fan 126 and fan drive 122. FIG. 2B, however, shows further the details of fan drive 122. As shown in this example, fan drive 122 includes power plant 208 (e.g., hydraulic pump, electric motor driver circuit, etc.) for driving a motor 210 (e.g., hydraulic motor, electric motor, etc.). Also included is optional transmission 212 (e.g., gearbox, belts/pulleys, etc.) that mechanically connects motor 210 to fan 126.

In a first configuration, power plant 208 is a hydraulic pump, motor 210 is a hydraulic motor and sensor 124 is hydraulic pressure sensor. During operation, controller 120 controls hydraulic pump 208 to pump hydraulic fluid into hydraulic motor 210 causing hydraulic motor 210 to rotate. A shaft 211 of hydraulic motor 210 is mechanically coupled to fan 126 either directly, or via transmission 212 which rotates fan 126 by shaft 213. Controller 120 monitors the hydraulic pressure in either pump 208 or motor 210 via hydraulic pressure sensor 124. When the pressure is determined to increase above a pressure threshold, combine controller 120 determines that there is low volume of MOG being processed by the cleaning system, and therefore decreases the output of fan drive 122 to reduce the speed of fan 126 by decreasing the pump pressure, altering transmission ratio of transmission 212, or a combination of both. In contrast, when the pressure is determined to decrease below a pressure threshold, combine controller 120 determines that there is high volume of MOG being processed by the cleaning system, and therefore increases the output of fan drive 122 to increase the speed of fan 126 by increasing the pump pressure, altering transmission ratio of transmission 212, or a combination of both. Controller 120 can continuously or periodically monitor pressure in hydraulic pump 208 or in hydraulic motor 210 and perform comparisons to one or more pressure thresholds set by controller 310.

In a second configuration, power plant 208 is an electric motor driver circuit, motor 210 is an electric motor and sensor 124 is an electrical power sensor. During operation, controller 120 controls electric motor driver circuit 208 to drive electric motor 210 causing electric motor 210 to rotate. A shaft of electric motor 210 mechanically coupled to fan 126 either directly, or via transmission 212 (e.g., pulley system, gearbox, etc.) rotates fan 126. Controller 120 monitors the electrical power drawn by either electric driver circuit 208 or electric motor 210 via electric power sensor 124. When the electrical power is determined to increase above a power threshold, combine controller 120 determines that there is low volume of MOG being processed by the cleaning system, and therefore decreases the output of fan drive 122 to reduce the speed of fan 126 by decreasing the power to the electric motor, altering transmission ratio of transmission 212, or a combination of both. In contrast, when the electrical power is determined to decrease below a power threshold, combine controller 120 determines that there is high volume of MOG being processed by the cleaning system, and therefore increases the output of fan drive 122 to increase the speed of fan 126 by increasing the power applied to the motor, altering transmission ratio of transmission 212, or a combination of both. Controller 120 can continuously or periodically monitor electrical power in electric motor driver circuit 208 or in electric motor 210 and perform comparisons to one or more power thresholds set by controller 310.

Although fan drive is described above, to include hydraulic motors or electric motors, it is noted that other fan drives are possible. For example, the fan drive could be the combustion engine of the combine connected to the fan via belts and pulleys. In addition, although fan drive 122 is shown to be separate from fan 126, it also noted that fan drive 122 and fan 126 could be a single integrated unit.

Although in the hydraulic and electrical examples described above, controller 310 utilizes sensors 124 as feedback to monitor and control power plant 208, it is noted that in other examples, power plant 208 may control itself without the need for combine controller 310 and/or sensors 124.

Figure 2C:
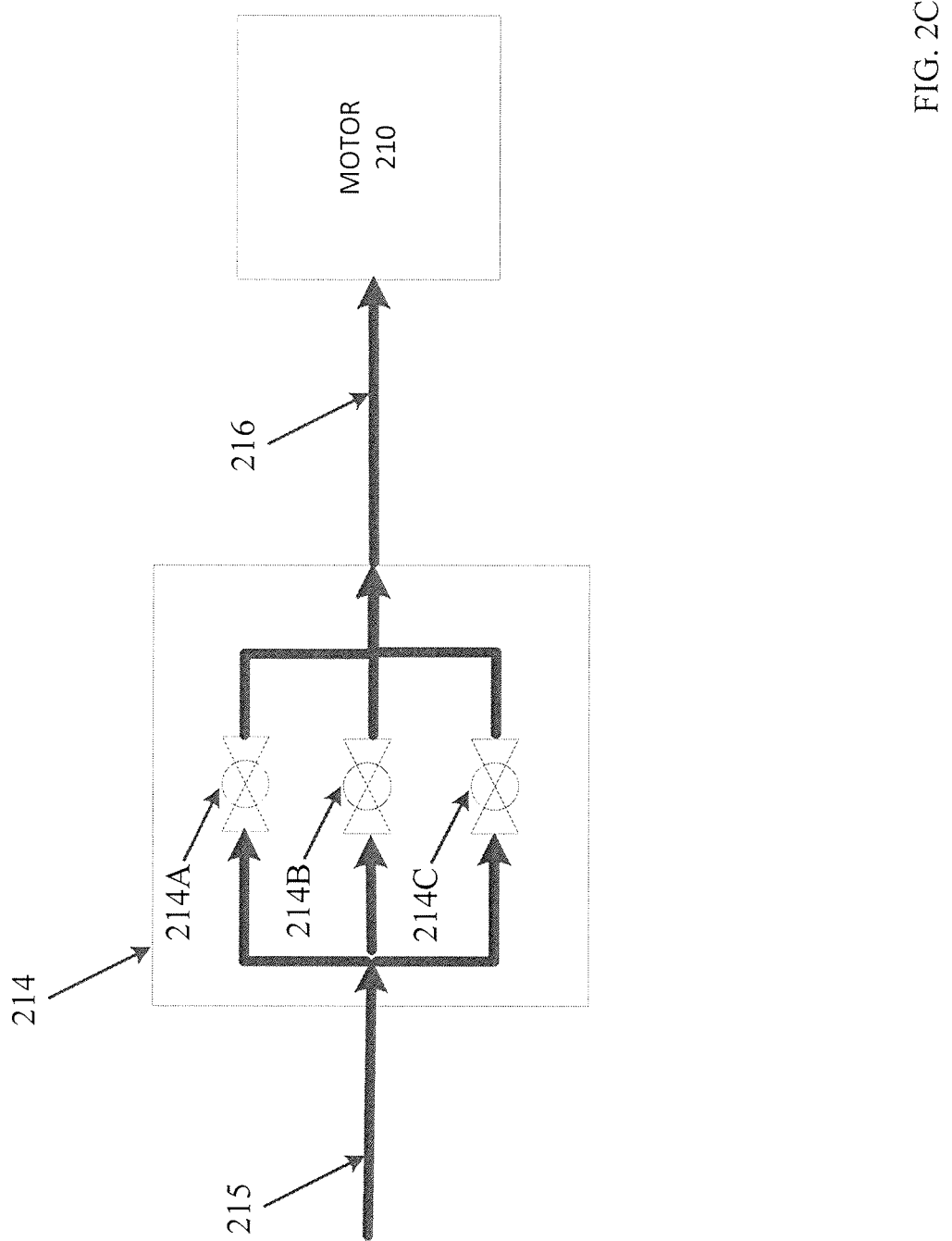
FIG. 2C is a block diagram of hydraulic valve for a drive system of the fan, according to an embodiment of the disclosure.

For example, in a third configuration, power plant 208 is a hydraulic pump, motor 210 is a hydraulic motor, and a mechanically (e.g. spring) activated hydraulic valve 214 in FIG. 2C controls the flow of hydraulic fluid from the hydraulic pump through line 215 to the hydraulic motor through line 216. During operation, controller 120 controls hydraulic pump 208 to pump hydraulic fluid at a predetermined pressure through line 215. Controller 120, however, does not have to monitor the hydraulic pressure in pump 208 or in motor 210, because the hydraulic valve 214 is mechanically activated by the pressure in hydraulic line 215. For example, the hydraulic valve 214 may include one or more input ports for receiving hydraulic fluid from the hydraulic pump, and multiple spring loaded valves 214A, 214B and 214C connected in parallel with each other for delivering pressurized hydraulic fluid to the hydraulic motor via line 216. Each spring loaded valve may be mechanically configured to open at a different pressure threshold (e.g. different spring strengths) and supply fluid to the motor.

For example, in a configuration where the valve has 3 spring loaded valves, the first valve may open at a pressure less than or equal to P1, the second valve may open at a pressure less than or equal to P2, and the third valve may open at a pressure less than or equal to P3, where P1<P2<P3. In this example, when the pump is turned ON, and the pressure is less than P1, all three valves are open such that the maximum pressure is applied to the motor and the fan speed is at its maximum. Then, if the pressure increases above P1 (e.g. due to a reduced MOG load), the hydraulic valve decreases the output of fan drive 122 to reduce the speed of fan 126 by closing the first valve (i.e. the increase in pressure closes the first valve so that only the second and third valves are open). If the pressure then increases above P2 (e.g. due to a further reduced MOG load), the hydraulic valve further decreases the output of fan drive 122 to reduce the speed of fan 126 by closing the first and second valves (i.e. the increase in pressure closes the first and second valves so that only the third valve is open).

If the pressure then decreases below P2 (e.g. due to an increased MOG load), the hydraulic valve increases the output of fan drive 122 to increase the speed of fan 126 by opening the second valve again (i.e. the decrease in pressure opens the second valve so that only the second and third valves are open). If the pressure decreases below P1 (e.g. due to an increased MOG load), the hydraulic valve increases the output of fan drive 122 to increase the speed of fan 126 by opening the first and second valves (i.e. the decrease in pressure opens the first valve so that all three valves are open again).

A similar configuration may be implemented in a system that uses an electric motor to drive the fan. For example, in a fourth configuration, power plant 208 is a motor driver circuit (e.g. pulse-width modulation (PWM) controller), motor 210 is an electric motor. During operation, controller 120 controls motor driver circuit to turn ON the fan. Controller 120, however, does not have to monitor the current drawn by the fan, because the motor driver circuit can perform this function. For example, the motor driver circuit may include a current sensing circuit (not shown) for monitoring the output current provided to the fan motor. This monitored current can be used to increase/decrease the fan speed when beneficial.

For example, three current threshold C1, C2 and C3 may be set, where C1<C2<C3. In this example, when the motor driver circuit is turned ON, and the output current is less than C1, the fan speed is at its maximum. Then, if the current increases above C1 (e.g. due to a reduced MOG load), the motor driver circuit decreases the output of fan drive 122 to reduce the speed of fan 126 (e.g. by controlling pulse width of the PWM signal that drives the motor). If the current then increases above C2 (e.g. due to a further reduced MOG load), the motor driver circuit further decreases the output of fan drive 122 to reduce the speed of fan 126.

If the current then decreases below C2 (e.g. due to an increased MOG load), the motor driver circuit increases the output of fan drive 122 to increase the speed of fan 126. If the current decreases below C1 (e.g. due to an increased MOG load), the motor driver circuit increases the output of fan drive 122 to increase the speed of fan 126.

Therefore, the system can be configured to rely on controller 120 and sensors 124, or to rely on a mechanical/electrical solution in power plant 208. It should also be noted that that system could be configured to rely on a combination of both. In either scenario, the system controls the speed of the fan based on the fan load caused by MOG.

Figure 3A:
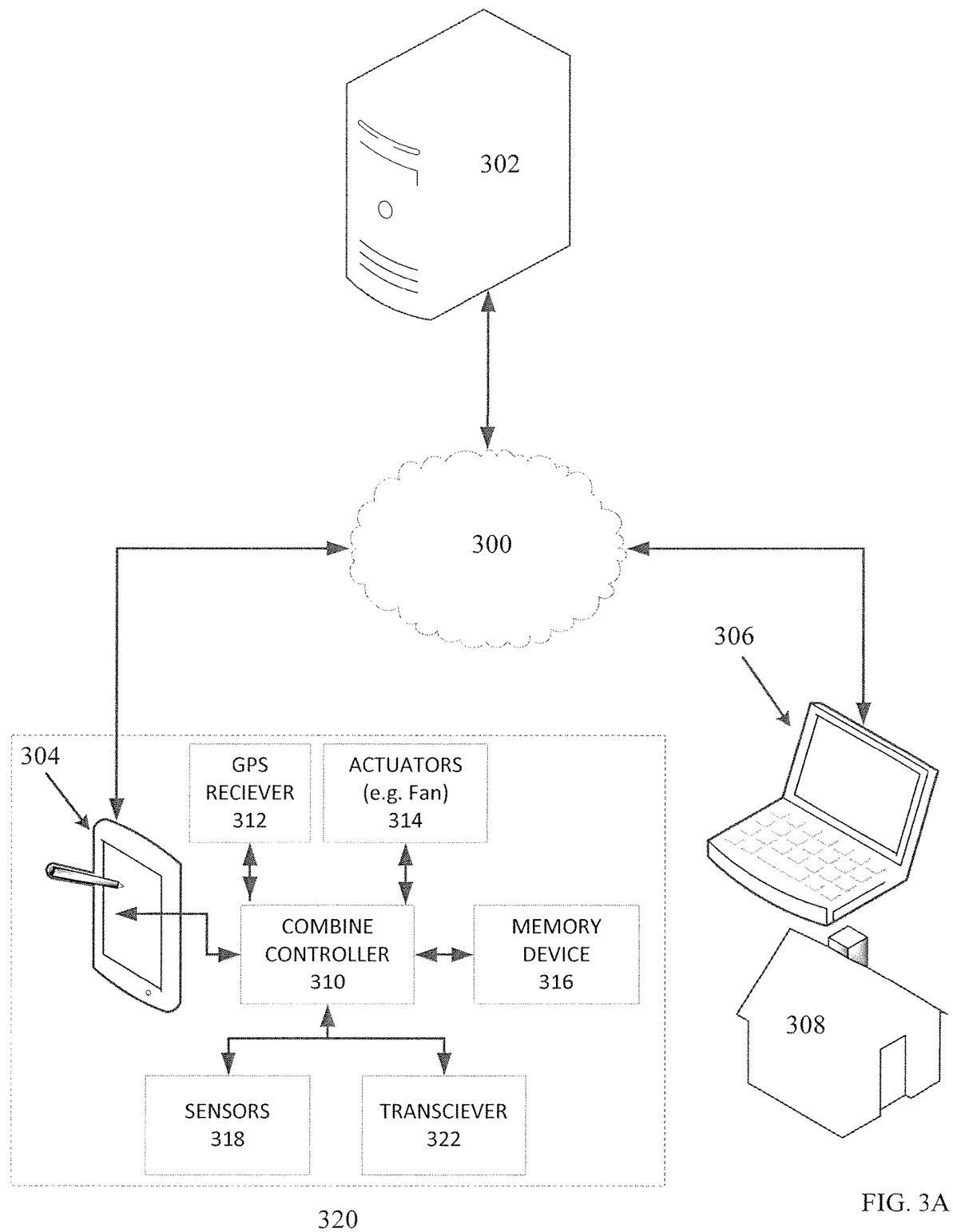
FIG. 3A is a block diagram of a control system for the combine, according to an embodiment of the disclosure.

FIG. 3A shows an example of a system for controlling the combine. The system includes an interconnection between a control system 320 of combine 10, a remote PC 306 and a remote server 302 through network 300 (e.g., Internet). It should be noted that combine 10 does not have to be connected to other devices through a network. The controller of combine 10 can be a standalone system that receives operating instructions (e.g., fan drive load thresholds and corresponding fan speeds) through the user interface, or through a removable memory device (e.g., Flash Drive).

Prior to operating combine 10, an operator may designate fan drive load thresholds (e.g., hydraulic pressure thresholds) and corresponding cleaning fan speeds. In one example, the operator uses interface 304 of the combine control system or PC 306 located at remote location 308. Interface 304 and PC 306 allows the operator to view locally stored parameters from memory device 316 and/or download parameters from server 302, using transceiver 322 (e.g., WiFi, Bluetooth, Cellular), through network 300. The operator may select (via Interface 304 or via PC 306) appropriate fan drive load thresholds and corresponding fan speeds based on various factors including but not limited to the type of crop to be harvested by the combine and the type of fan drive. Once these thresholds and speeds are selected, the operator begins harvesting. Combine controller 310 then controls actuators 314 (e.g., fan 52) based on the thresholds. For example, sensors 318 (e.g., hydraulic pressure sensor) may be used during harvesting to compare the current hydraulic pressure to pressure thresholds in order to control fan 52 accordingly. It is also noted that harvesting may also be tracked and aided by GPS receiver 312, which could also be used to set thresholds and fan speeds.

Figure 3B:
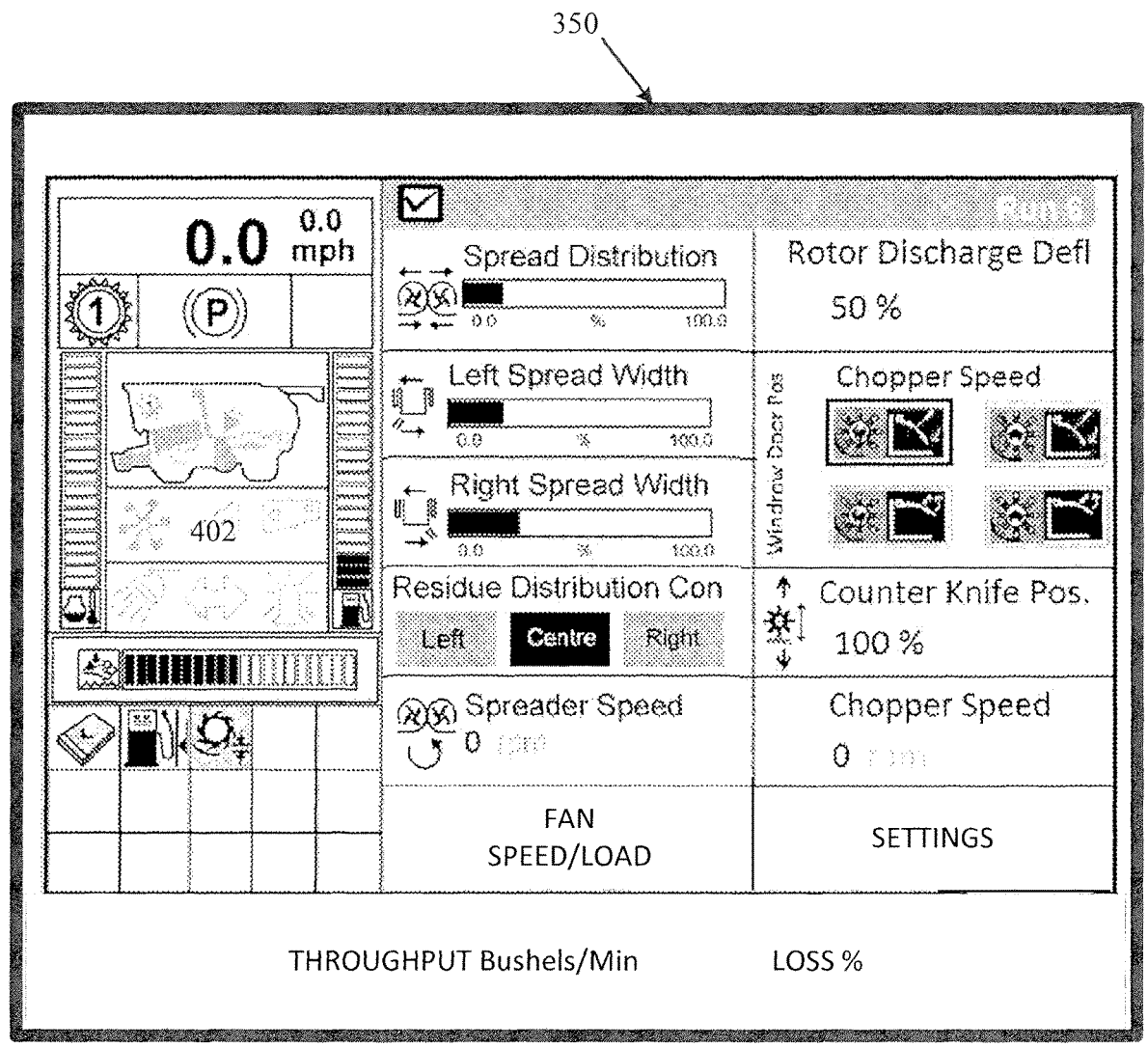
FIG. 3B is an illustration of a user interface for monitoring and controlling the combine, according to an embodiment of the disclosure.

An example of interface 304 is shown in FIG. 3B, where various parameters and other harvesting data are displayed to the operator through a graphical user interface (GUI) 400. These parameters may include a graphical view of the map 402 with designated zones, land grade (not shown), current operational mode (spreading/windrow modes), operational parameters/states for the spreader impellers (e.g., ON/OFF), operational parameters/states for the chopper (e.g., rotation speed), operational parameters/states for the counter knives (e.g., engage/disengage), operational parameters/states for the swath selection door (e.g., open/closed), operational parameters/states for the spreader chute position (e.g., horizontal/vertical), etc. Also included are the operational parameters/states of the current cleaning fan speed and fan drive load. The operator may set the thresholds and speeds of the fan by choosing the settings button which launches a screen (not shown) for viewing and/or adjusting these parameters.

FIG. 4A shows examples of three tables for setting the fan drive load thresholds and corresponding fan speeds. For example, table 402 in FIG. 4A shows settings for controlling the fan speed based on hydraulic pressure. Table 402 includes four hydraulic pressure thresholds and four corresponding fan speeds in revolutions per minute (RPM).

Figure 4B:
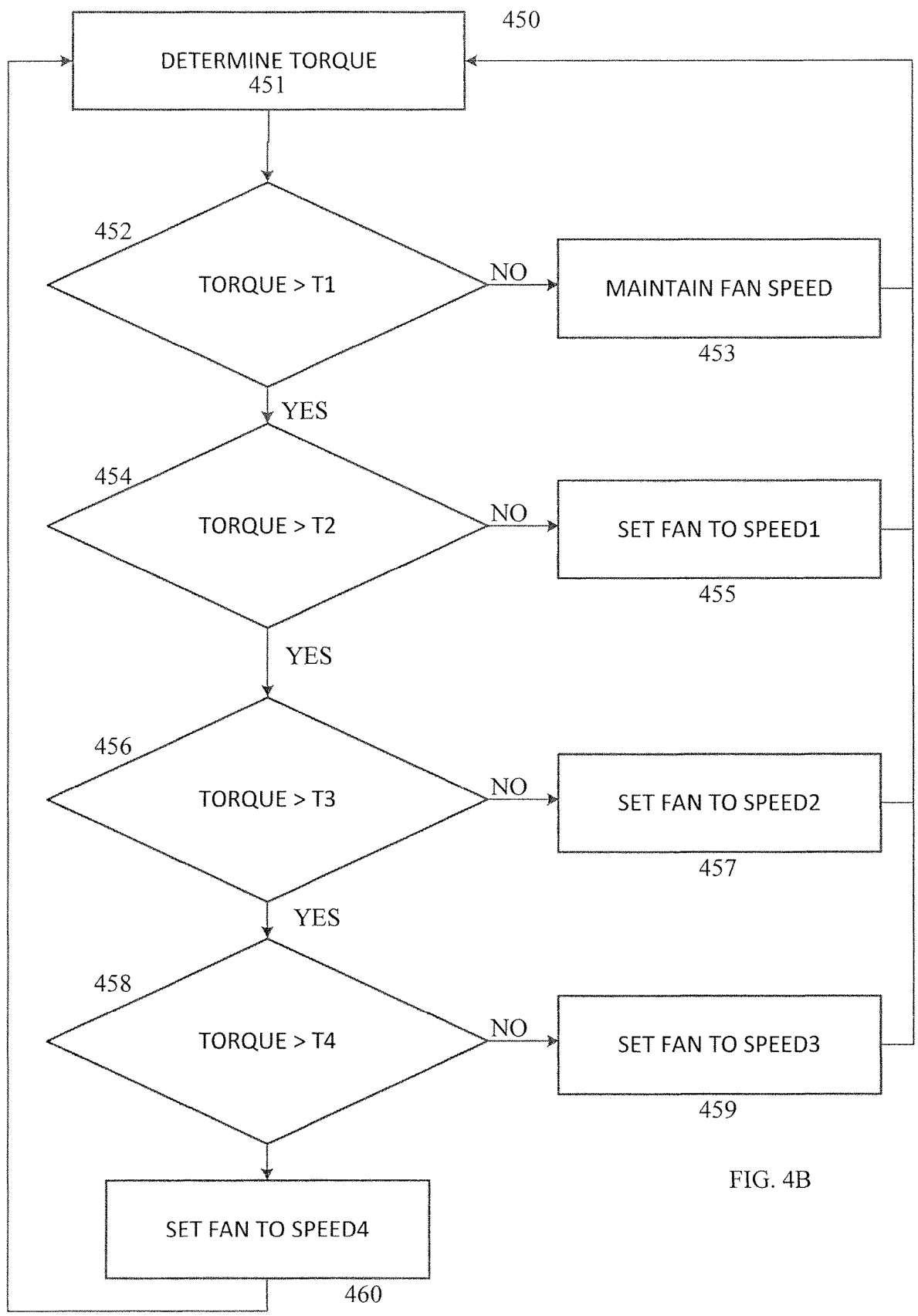
FIG. 4B is a flowchart of steps for automatically controlling the cleaning fan speed based on torque thresholds, according to an embodiment of the disclosure.

Table 404 in FIG. 4B shows settings for controlling the fan based on mechanical torque. Table 404 includes four mechanical torque thresholds and four corresponding fan speeds in revolutions per minute (RPM).

Table 406 in FIG. 4B shows settings for controlling the fan based on electrical power. Table includes four electrical power thresholds and four corresponding fan speeds in revolutions per minute (RPM).

It is noted that although four entries are shown in the tables of FIG. 4A, the number of table entries can be any value between 1 and N, where N is an integer value. It is also noted that when controlling the fan speed fan drive load, different types of logical operators can be used and multiple thresholds could also be used.

Controlling the combine based on the table 404 in FIG. 4A is illustrated by the flowchart in FIG. 4B. In this example, it is assumed that SPEED1>SPEED2>SPEED3>SPEED4, and that T4>T3>T2>T1.

In step 450, controller 310 determines mechanical torque (e.g., torque of the motor, transmission, fan, etc.) based on a signal from a torque sensor 318. In step 452, controller 310 compares the torque to torque threshold T1. If torque is not greater than torque threshold T1, then controller 310 maintains the current speed of fan 126 in step 453 (e.g., fan drive load has not increased, and therefore fan speed is maintained). If torque is greater than torque threshold T1, then controller 310 compares the torque to torque threshold T2 in step 454. If the torque is not greater than torque threshold T2, then controller 310 sets the current speed of fan 126 in step 455 to SPEED1 (e.g., fan drive load has increased, and therefore fan speed is decreased). If the torque is greater than torque threshold T2, then controller 310 compares the torque to torque threshold T3 in step 456. If the torque is not greater than torque threshold T3, then controller 310 sets the current speed of fan 126 in step 457 to SPEED2 (e.g., fan drive load has increased, and therefore fan speed is decreased). If the torque is greater than torque threshold T3, then controller 310 compares the torque to torque threshold T4 in step 458. If the torque is not greater than torque threshold T4, then controller 310 sets the current speed of fan 126 in step 459 to SPEED3 (e.g., fan drive load has increased, and therefore fan speed is decreased). If the torque is greater than torque threshold T4, then controller 310 sets the current speed of fan 126 in step 460 to SPEED4 (e.g., fan drive load has increased, and therefore fan speed is decreased). This process may be periodically repeated by controller 310 to ensure that the speed of fan 126 is set according to the current torque required for driving fan 126.

Steps 451-460 shown in FIG. 4B are performed by controller 310 upon loading and executing software code or instructions which are tangibly stored on a tangible computer readable medium 316, such as on a magnetic medium, e.g., a computer hard drive, an optical medium, e.g., an optical disc, solid-state memory, e.g., flash memory, or other storage media known in the art. Thus, any of the functionality performed by the controller 310 described herein, such as the steps shown in FIG. 4B, are implemented in software code or instructions which are tangibly stored on a tangible computer readable medium. Upon loading and executing such software code or instructions by the controller 310, the controller 310 may perform any of the functionality of the controller 310 described herein, including the steps shown in FIG. 4B described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

Although the disclosure is illustrated and described herein with reference to specific embodiments, the disclosure is not intended to be limited to the details shown. Rather various modifications may be made in the details within the scope and range of equivalence of the claims and without departing from the disclosure.

The invention claimed is:

1. A combine comprising:
    a feeder housing for receiving harvested crop;
    a separating system for threshing the harvested crop to separate grain from residue;
    a crop cleaning system including a cleaning fan powered by a fan drive to drive the cleaning fan at a speed and propel the residue into a residue system of the combine;
    at least one sensor for detecting an operational parameter of the fan drive; and
    a controller coupled to the at least one sensor, the controller configured to:
        determine a load on the fan drive from the detected operational parameter, wherein the operational parameter is an amount of hydraulic pressure, electric power, or mechanical torque required in order to drive the cleaning fan at the speed,
        compare the determined load to a load threshold, and
        control the speed of the cleaning fan based on the comparison by:
            reducing the speed of the cleaning fan in response to an increase in the load, and
            increasing the speed of the cleaning fan in response to a decrease in the load.

2. The combine of claim 1,
    wherein the controller is further configured to:
        compare the load to the load threshold,
        maintain the speed of the cleaning fan when the load is less than the load threshold, and
        decrease the speed of the cleaning fan when the load is greater than the load threshold.

3. The combine of claim 1,
    wherein the controller is further configured to:
        compare the load to a second load threshold, and
        control the speed of the cleaning fan based on the comparison between the load and the second load threshold.

4. The combine of claim 1,
    wherein the controller is further configured to:
        compare the load to the load threshold, and
        increase the speed of the cleaning fan when the load is less than the load threshold.

5. The combine of claim 1,
    wherein the fan drive includes a hydraulic motor, and the sensor includes a hydraulic pressure sensor, and
    wherein the controller is further configured to:
        determine the load on the fan drive from hydraulic pressure detected by the sensor, and
        control the speed of the cleaning fan based on the detected hydraulic pressure.

6. The combine of claim 5,
    wherein the fan drive includes a hydraulic pump, and
    wherein the controller is further configured to:
        control the hydraulic pump to control the speed of the cleaning fan.

7. The combine of claim 1,
    wherein the fan drive includes a transmission and a motor, and the sensor includes a torque sensor, and wherein the controller is further configured to:
   determine the load on the fan drive from torque detected by the torque sensor, and
   control the speed of the cleaning fan by controlling the power applied to the fan motor based on the detected torque or control a gear ratio of the fan drive transmission based on the detected torque.

8. The combine of claim 1,
wherein the fan drive includes an electric motor, and the sensor includes an electrical power sensor, and
wherein the controller is further configured to:
   determine the load on the fan drive from electrical power detected by the sensor, and
   control speed of the cleaning fan by controlling the power applied to the electric motor based on the detected electric power.

9. The combine of claim 8,
wherein the fan drive includes an electric motor driver circuit, and
wherein the controller is further configured to:
   control the electric motor driver circuit to control the power applied to the electric motor.

10. The combine of claim 1, further comprising:
a touch screen display,
wherein the controller is further configured to:
   display an indicator on the touch screen display that indicates the operational parameter of the cleaning fan,
   receive user input through the touch screen display indicating fan speed settings for a given operational parameter, and
   control the speed of the fan based on the received input.

11. A method for controlling a combine comprising:
receiving, by a feeder housing, harvested crop;
threshing, by a separating system, the harvested crop to separate grain from residue;
cleaning, by a crop cleaning system including a cleaning fan powered by a fan drive, by driving the cleaning fan at a speed and propelling the residue into a residue system of the combine;
detecting, by at least one sensor, an operational parameter of the fan drive;
determining, by a controller coupled to the at least one sensor, a load on the fan drive from the detected operational parameter, wherein the operational parameter is an amount of hydraulic pressure, electric power, or mechanical torque required in order to drive the cleaning fan at the speed;
comparing, by the controller, the determined load to a load threshold; and
controlling, by the controller, the speed of the cleaning fan based on the comparison by:
   reducing the speed of the cleaning fan in response to an increase in the load, and
   increasing the speed of the cleaning fan in response to a decrease in the load.

12. The method of claim 11, further comprising:
comparing, by the controller, the load to the load threshold;
maintaining, by the controller, the speed of the cleaning fan when the load is less than the load threshold; and
decreasing, by the controller, the speed of the cleaning fan when the load is greater than the load threshold.

13. The method of claim 11, further comprising:
comparing, by the controller, the load to a second load threshold; and
controlling, by the controller, the speed of the cleaning fan based on the comparison between the load and the second load threshold.

14. The method of claim 11, further comprising:
comparing, by the controller, the load to the load threshold; and
increasing, by the controller, the speed of the cleaning fan when the load is less than the load threshold.

15. The method of claim 11, further comprising:
determining, by the controller, the load on the fan drive from a hydraulic pressure detected by a hydraulic pressure sensor included in the sensor; and
controlling, by the controller, the speed of the cleaning fan by controlling the power applied to a hydraulic motor included in the fan drive based on the detected hydraulic pressure.

16. The method of claim 15, further comprising:
controlling, by the controller, a hydraulic pump included in the fan drive to control the power applied to the hydraulic motor.

17. The method of claim 11, wherein the at least one sensor includes a torque sensor, the method further comprising:
determining, by the controller, the load on the fan drive from a torque detected by the torque sensor; and
controlling, by the controller, the speed of the cleaning fan by controlling the power applied to the motor based on the detected torque, or by controlling a gear ratio of a transmission included in the fan drive based on the detected torque.

18. The method of claim 11, wherein the at least one sensor includes electric power sensor, the method further comprising:
determining, by the controller, the load on the fan drive from an electrical power detected by the electric power sensor; and
controlling, by the controller, the speed of the cleaning fan by controlling the power applied to an electric motor included in the fan drive based on the detected electric power.

19. The method of claim 18, further comprising:
controlling, by the controller, an electric motor driver circuit included in the fan drive to control the power applied to the electric motor.

20. The method of claim 11, further comprising:
displaying, by a touchscreen display, an indicator that indicates the operational parameter of the cleaning fan;
receiving, by the touchscreen display, user input indicating fan speed settings for a given operational parameter; and
controlling, the speed of the cleaning fan by controlling the fan drive power based on the received input.

* * * * *